United States Patent [19]

Reed, Jr. et al.

[11] 4,201,605
[45] May 6, 1980

[54] GAS GENERATOR PROPELLANT FOR AIRBREATHING MISSILES

[75] Inventors: Russell Reed, Jr., Ridgecrest; George F. Sieg, China Lake; Elmer J. Rhyn, Ridgecrest; Billy E. Waldon, China Lake, all of Calif.

[73] Assignee: The United States of America as represented by the Secretary of the Navy, Washington, D.C.

[21] Appl. No.: 929,597

[22] Filed: Jul. 31, 1978

[51] Int. Cl.$^2$ ............................................. C06B 45/10
[52] U.S. Cl. ...................................... 149/19.1; 149/76
[58] Field of Search .................................. 149/19.1, 76

[56] References Cited

U.S. PATENT DOCUMENTS

| | | | |
|---|---|---|---|
| 2,997,376 | 8/1961 | Bartley | 149/19.1 |
| 3,172,793 | 3/1965 | Markowitz | 149/19.1 |
| 3,193,421 | 7/1965 | Sutton | 149/19 |
| 3,383,860 | 5/1968 | Sayles | 149/19.1 |
| 3,467,558 | 9/1969 | Wernette et al. | 149/19 |
| 3,706,610 | 12/1972 | Ferguson | 149/19.1 |
| 3,714,047 | 1/1973 | Marion et al. | 252/62 |

*Primary Examiner*—Edward A. Miller
*Attorney, Agent, or Firm*—R. S. Sciascia; W. Thom Skeer; L. E. K. Pohl

[57] ABSTRACT

A propellant formulation comprising a polysulfide binder having the formula $-(SCH_2CH_2OCH_2OCH_2CH_2S)_n-$ wherein n is a positive integer of sufficient magnitude to render the binder an elastomeric solid, ammonium perchlorate, ammonium oxalate and iron oxide. The formulation has properties which render it useful for generating gas to pressurize the fuel systems in air-breathing missiles.

3 Claims, No Drawings

GAS GENERATOR PROPELLANT FOR AIRBREATHING MISSILES

BACKGROUND OF THE INVENTION

1. Field of the Invention

This invention relates to propellant formulations for use in gas generators and particularly to propellant formulations for use in gas generators used to pressurize the fuel systems in air-breathing missiles.

2. Description of the Prior Art

The fuel systems in liquid fueled air-breathing missiles utilize bladders which must be pressurized to expel the fuel. Gas generators used to pressurize these bladders must meet certain specifications not normally required of gas generators. They must produce gases that are lower in temperature than those ordinarily produced by gas generators. In addition, they must produce these gases more rapidly than ordinary gas generators and, therefore, require faster burning propellants. Further, they must maintain constant pressure for approximately 90 seconds and thus must burn at a constant burning rate. Still further, the gases produced must be substantially free of solids.

Current gas generator propellants do not meet the aforementioned specifications. All of them fall short in at least one of the requirements and most fall short in at least two catagories.

SUMMARY OF THE INVENTION

It has now been found that a gas generator propellant comprising a polysulfide binder having the formula $-(SCH_2CH_2OCH_2OCH_2CH_2S)_n-$ wherein n is a positive integer having a magnitude sufficient to render the binder an elastomeric solid, ammonium perchlorate, ammonium oxalate and iron oxide meets the specifications required of propellants used to pressurize bladders in the fuel systems of air-breathing missiles.

DESCRIPTION OF THE PREFERRED EMBODIMENTS

To prepare a gas generator propellant according to this invention, one mixes the binder (which is normally a liquid), curatives, fine (1–5 micron) ammonium perchlorate oxidizer, ammonium oxalate coolant and iron oxide burn rate catalyst and heats the mixture to from 130° to 150° F. for about 24 hours to cure the binder. Para quinone dioxime, diphenyl quanidine, magnesium oxide and polymeric sulfur are included within the term "curatives".

The best mode of practicing the invention resides in utilizing 50 weight percent binder (including curatives), 31 weight percent ammonium perchlorate, 15 weight percent ammonium oxalate and 4 weight percent iron oxide. A propellant containing those ingredients in those amounts burns at a rate of 0.150 inch per second, produces a measured flame temperature of about 1280° F. and produces substantially no solids. The mix, before cure, is actually made up of 44.02 weight percent polysulfide (LP-33), 3.245 weight percent para quinone dioxime, 0.204 weight percent diphenyl guanidine, 0.327 weight percent magnesium oxide, 0.204 weight percent polymeric sulfur and the above amounts of oxidizer, coolant and burn rate catalyst. The diameter of the oxidizer is preferably in the 1 to 5 micron range.

The amounts of all of the ingredients may be varied somewhat. The following table sets forth ranges in which the ingredients may be varied without destroying the capability of the propellant as a pressurizer for air-breathing missile fuel systems.

TABLE

| INGREDIENT | WEIGHT PERCENT RANGE |
| --- | --- |
| Polysulfide | 40–48 |
| Para Quinone Dioxime | 2.95–3.57 |
| Diphenyl Guanidine | 0.190–0.224 |
| Magnesium Oxide | 2.12–2.56 |
| Polymeric Sulfur | 0.204–0.224 |
| Ammonium Perchlorate | 20–34 |
| Ammonium Oxalate | 8–31 |
| Iron Oxide | 1–4 |

Burning rates increase as the particle size of ammonium oxalate increases. A particle size of 24 microns is preferred.

The relatively high burning rate of the gas generant propellants of this invention is due to: (1) the carbonsulfur linkages in the binder which enhance the rate at which the binder reacts with the oxidizer, (2) the presence of iron oxide and (3) the small (1–5 micron) diameter of the particles of ammonium perchlorate oxidizer. Ammonium oxalate is used as the coolant because it is efficient in absorbing heat and does not produce solids in the gaseous mixture when the propellant is burned. The low heat of combustion of the polysulfide binder and the low content of ammonium perchlorate both contribute to the low flame temperature with the latter probably being more important.

In general, if binder levels are increased it is desirable to decrease the level of ammonium oxalate since the combination of increased binder and decreased oxidizer results in decreased flame temperatures. The solids may tend to settle as the binder level is increased, an effect which can be overcome to some extent by decreasing the temperature of mixing. Binder levels above those cited as preferred are not advantageous because of the aforementioned settling and the increased combustion residue which is formed.

The polysulfide binder, $-(SCH_2CH_2OCH_2OCH_2CH_2S)_n-$, is available commercially from Thiokol Corporation. As is pointed out above, it comes as a liquid but cures to a solid under the aforementioned curing conditions.

What is claimed is:

1. A propellant formulation for a gas generator consisting essentially of from about 40 to 48 weight percent of a polysulfide binder having the formula: $-(SCH_2CH_2OCH_2OCH_2CH_2S)_n-$ wherein n is a positive integer of sufficient magnitude to render the polysulfide an elastomeric solid, from about 20 to about 34 weight percent ammonium perchlorate, from about 8 to about 31 weight percent ammonium oxalate and from about 1 to about 4 weight percent iron oxide.

2. A propellant formulation according to claim 1 wherein the weight percent of said polysulfide binder is 48, the weight percent of said ammonium perchlorate is 31, the weight percent of said ammonium oxalate is 15 and the weight percent of said iron oxide is 4.

3. A propellant formulation according to claim 1 which burns at a rate of at least 0.150 inch per second and produces a measured flame temperature of about 1280° F.